United States Patent [19]

Xanthos et al.

[11] 3,965,284

[45] June 22, 1976

[54] CHEMICALLY OPENING CHRYSOTILE ASBESTOS AND ENCAPSULATING

[75] Inventors: Marinos Xanthos; Raymond T. Woodhams, both of Toronto, Canada

[73] Assignee: Canadian Patents and Development Limited, Ottawa, Canada

[22] Filed: Jan. 19, 1973

[21] Appl. No.: 325,149

[30] Foreign Application Priority Data

Jan. 27, 1972 Canada.............................. 133336

[52] U.S. Cl................................ 428/404; 162/155; 427/221; 427/299; 427/340; 427/341; 428/407
[51] Int. Cl.²......................................... B32B 17/00
[58] Field of Search............... 117/126 AB, 126 AQ, 117/100 S, 62.1, 62.2; 162/155; 427/299, 221, 340, 341; 428/404, 407

[56] References Cited
UNITED STATES PATENTS

| | | | |
|---|---|---|---|
| 2,609,313 | 9/1952 | Fettel | 117/126 AB |
| 2,940,892 | 1/1960 | Feigley et al. | 162/155 |
| 3,409,499 | 11/1968 | Dresher et al. | 162/155 |
| 3,410,751 | 11/1968 | Battista | 162/155 |
| 3,519,591 | 7/1970 | Bolger | 117/126 AQ |
| 3,535,150 | 10/1970 | Lipsett | 117/100 S |
| 3,582,460 | 6/1971 | Lipsett | 162/155 |
| 3,635,879 | 1/1972 | Baer et al. | 117/100 S |
| 3,721,637 | 3/1973 | Schultz et al. | 162/155 |

*Primary Examiner*—Ronald H. Smith
*Assistant Examiner*—Dennis C. Konopacki
*Attorney, Agent, or Firm*—Alan A. Thomson

[57] ABSTRACT

Chrysotile asbestos is chemically opened into the individual fibrils by soluble vinylic polymer polyelectrolytes containing carboxylic acid groups in aqueous media. Polyacrylic acids, polymethacrylic acids, maleic anhydride polymers and water-soluble copolymers thereof are preferred polyelectrolytes and form stable colloidal dispersions. The polyelectrolytes are neutralized to alkaline pH with inorganic or organic bases, but preferably with basic vinylic monomers when complete encapsulation is desired. By a further aspect of the invention the polyelectrolyte-coated fibrils in aqueous dispersion are encapsulated by copolymerization with (a) a basic vinylic comonomer (used for pH control) such as dimethylaminoethyl methacrylate, t-butylaminoethyl methacrylate or a vinylpyridine; and (b) a non-basic vinylic comonomer such as styrene, divinylbenzene, vinyl chloride or fluoride, vinyl acetate, methyl methacrylate, ethyl acrylate, acrylonitrile, and methacrylonitrile. The encapsulated fibrils are advantageous for forming reinforced composites including laminates and foamed or cellular products.

13 Claims, 4 Drawing Figures

Polymerization of styrene in the
presence of polymethacrylic acid
neutralized with sodium hydroxide.

Polymerization of styrene in the presence
of a copolymer of styrene-acrylic acid
neutralized with ammonia.

Electron micrograph showing completely coated Chrysotile fibrils. Copolymerization of styrene/dimethylaminoethyl methacrylate (3/1) in the presence of polyacrylic acid. 6,340x.

Electron micrograph showing completely coated chrysotile fibrils. Copolymerization of methyl methacrylate/ dimethylaminoethyl methacrylate (3/1) in the presence of polyacrylic acid. 7 940x.

CHEMICALLY OPENING CHRYSOTILE ASBESTOS AND ENCAPSULATING

The asbestos minerals comprise the fibrous form of serpentine, known as chrysotile, and five minerals of the amphibole group, namely: anthophyllite, crocidolite, actinolite, tremolite and amosite. Chrysotile, one of the most useful and plentiful forms of asbestos, may be opened into discrete fibrils (a) mechanically by a combination of crushing and high speed air turbulence and/or (b) by chemical methods of opening employing various known chemical opening agents.

Chemical opening agents used previously include selected surfactants including fatty acid soaps, acrylic acid, methacrylic acid or maleic anhydride monomer (at acid pH), and saturated amines such as triethanolamine. Inorganic salts have also been used. In many cases, the degree of opening or the stability of the aqueous dispersion is less than desirable, or the residue of the agent remaining on the fibrils is deleterious in subsequent use and difficult to remove. The present invention is believed to have several important advantages over former methods.

The asbestos employed in the processes and products of this invention is known as Chrysotile. Chrysotile, being a common and plentiful form of asbestos, is widely used as a filler in synthetic organic polymer compositions. However, in order to make best use of its reinforcing properties, the mechanically-opened mineral must be separated into its primary fibrils of an average diameter of 250 – 500 A. This mineral should first be broken up in a preliminary way mechanically as in a crusher or chopping mill and then further opened e.g. by turbulent, high speed air jets. Mechanical agitation is not able to separate the individual fibrils from each other and form a stable dispersion. The presence of a dispersing agent is therefore necessary to disperse and stabilize the individual fibrils of Chrysotile in water.

It has been discovered that polyelectrolytes having free carboxylic acid groups and in particular polyacrylic acid, polymethacrylic acid, maleic anhydride polymers and water-soluble copolymers thereof are excellent aqueous dispersing and opening agents for Chrysotile. The pH of the solution used for the chemical opening should be carefully adjusted to the alkaline side for best results; preferably a pH of 8–10 is maintained, resulting in dispersions of excellent stability. In a typical example a 0.5% solution of polyacrylic acid neutralized to pH 8 with sodium hydroxide is added to a weighed quantity of mechanically-opened Chrysotile. In order to hasten the process of chemical opening the suspension is subjected to high shear agitation for few minutes, such as in a Waring Blendor. A uniform colloidal suspension results which shows excellent separation of the individual fibrils when examined under the electron microscope.

The amount of dispersing agent may be as little as about 0.1% based on the weight of dry asbestos or as great as 1000% for some purposes. The aqueous dispersion of asbestos is usually in the range of 1–10% solids since concentrations above 10% become too viscous to handle. In cases where the polyelectrolyte may act subsequently as a binder, the proportion of polymeric dispersing agent may be greater than necessary for complete dispersion. Such dispersions are easily spun into continuous fibres, the resulting fibres showing good strength after drying to remove excess water. The dispersion may be spun through an orifice into a coagulatinng medium such as for example an organic liquid, an aqueous solution of alkaline earth metal ions (e.g. calcium, barium) or by passing into an aqueous solution of low pH e.g. below about 5.

Mats or papers of asbestos may be formed simply by depositing a layer of the chemically-opened fibres on a surface and then removing the water. The polyelectrolytes will act as a binder, becoming insolubilized on heating and producing a tough sheet of material. Other uses for these dispersions include the preparation of rigid, low density panels for sound and heat insulation and battery separators.

In the attached Figures which illustrate embodiments of and the advantages of a preferred aspect of, the invention (see Example XIII)

Figure 1:
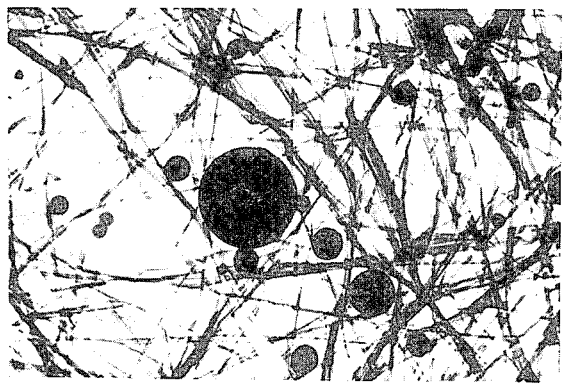
FIG. 1 is a photomicrograph at magnification 10450 of Chrysotile fibrils opened with polymethacrylic acid neutralized with sodium hydroxide and showing globules of styrene polymerized in situ.

In a preferred aspect of the invention, a basic vinylic monomer is used to neutralize and polymerize onto the polyelectrolyte, and has basic amino groups or basic heterocyclic nitrogen atoms in the molecule. Suitable basic monomers include dimethylaminoethyl methacrylate, t-butylaminoethyl methacrylate and a vinylpyridine (as any isomer) or mixtures thereof. If the basic monomer is used as the sole neutralizing agent it should be present in equivalent amount to neutralize or combine with the free carboxylic acid groups of the polyelectrolyte. Mixtures of the various neutralizing agents may be advantageous for particular purposes e.g. ammonia with vinylpyridine.

Operative inorganic neutralizing agents which may be used in whole or in part include the alkali metal and ammonium hydroxides.

In some cases, it is advantageous to employ a volatile base as a neutralizing agent, i.e. ammonia, although any volatile organic amine may be chosen. The resulting dispersion can be converted to filaments or mats which after moderate heating to remove the volatile base are less sensitive to moisture. In such cases the reactive carboxyl groups are believed to form insoluble salts with the magnesium ions present in the asbestos.

Lightweight insulating materials have also been prepared by using the above asbestos mats after drying. The polyelectrolyte, after removal of the excess moisture serves to chemically bond the submicroscopic fibrils together. Furthermore the polyelectrolyte can be made completely insoluble by post-treatment with alkaline earth ions of calcium or barium.

The use of these polyelectrolytes particularly acrylic acid copolymers, methacrylic acid copolymers or maleic anhydride copolymers offer considerable control over the degree of chemical opening, the stability of the resulting dispersion, binding efficiency after drying, and other factors associated with processing and performance. In addition to the composition of the copolymers and choice of neutralizing agent or basic comonomer, the molecular weight at each stage may be chosen so as to give optimum processability.

This invention will be better understood by reference to the following illustrative examples.

EXAMPLE I

Chrysotile asbestos, grade Plastibest No. 20 (trademark of Canadian Johns-Manville Co., Ltd.) was the type of asbestos used. Three grams of coarse mechanically-shredded fibres were suspended in 297 grams of distilled water containing 1.5 g. of polyacrylic acid (Acrysol A-3, Rohm and Haas Co.). After three minutes agitation at low speed in a Waring Blendor an equivalent amount of sodium hydroxide solution was added in order to raise the pH to 8. The thick, viscous suspension was further stirred at high speed for 10 minutes. Excellent, stable dispersions were formed by this process. No agglomerates or fibre bundles were visible under the microscope.

EXAMPLE II

Chrysotile shreds were treated in exactly the same manner as in Example I, but in this case polymethacrylic acid neutralized with ammonia was used as dispersing agent. A 2% asbestos dispersion in water was prepared, containing 0.25 g. polymethacrylic acid per g. of asbestos. Under the electron microscope the completely separated fibrils of average diameter 500 A were visible.

EXAMPLE III 0.75 g. of a styrene/acrylic acid copolymer (carboxyl content 0.75 g. equiv. —COOH per 100 g. of polymer) were dissolved in 300 cc of distilled water containing an equivalent amount of sodium hydroxide to give a pH of about 8. 3 g. of Chrysotile asbestos shreds (Plastibest No. 20) were added and the suspension was stirred in a Waring Blender for 10 minutes. A dispersion of excellent stability resulted which showed no agglomerates or visible particles.

EXAMPLE IV 3 g. of a methyl methacrylate/acrylic acid copolymer (carboxyl content 0.54 g. equiv. —COOH per 100 g. of polymer) were dissolved in 300 cc of distilled water containing an equivalent amount of sodium hydroxide to give a pH of about 8. 300 cc of an 1% asbestos dispersion were then prepared as in Example III with similar results.

EXAMPLE V 1.2 g. of a styrene/maleic anhydride copolymer (SMA 1420 A, Sinclair Oil Co.) were dissolved in 300 cc of distilled water containing an equivalent amount of sodium hydroxide. 300 cc of 0.75% asbestos dispersion were prepared as in Example III and IV (pH about 8). The resulting suspension was stable and showed excellent separation of the fibrils.

EXAMPLE VI

This example illustrates the preparation of a rigid, tough, lightweight expanded structure using the chemically-opened coated asbestos fibrils of this invention. 100 g. of an aqueous solution of 0.25% polyacrylic acid (made by adding 1.0 g. Acrysol A-3 (tradename) to 99 g. distilled water) was adjusted to pH 8 by the addition of ammonia. This solution was added to 5 g. of Chrysotile asbestos shreds (Plastibest No. 20) and thoroughly blended in a high-speed mixer of the Waring Blender type. The resulting thick, dough-like mass was placed in a beaker and heated to dryness in a radio frequency (RF) oven. The mass in this case retained its original shape and occupies a volume equal to that of the original mixture. The density was approximately 8 lb/ft$^3$. The tough, rigid mass did not disintegrate even when boiled for a prolonged period in water, showing that the process is irreversible. Suitable adjustment of the viscosity of the original mixture can be employed to permit foaming or expansion to take place during the drying state, thereby resulting in a much lower density.

Such rigid foams are desirable for insulating purposes where high heat resistance is required. The composition of the polyelectrolyte dispersing agent can be selected to provide specialized properties for different applications.

EXAMPLE VII 2.0 g. Chrysotile asbestos shreds (Plastibest No. 20) were dispersed in 100 g. of a polyacrylic acid solution containing 0.5 g. polyacrylic acid adjusted to pH 8 with ammonia. The colloidal suspension was spun through a small orifice (a hypodermic syringe) into a coagulating bath containing dissolved barium acetate. The precipitated fiber was pulled under slight tension to induce orientation of the asbestos fibrils using a conveyor system in which the speed of drawing could be adjusted to conform with the speed of extrusion. A slight positive pressure of nitrogen could be employed to control the speed of extrusion through the orifice. A continuous thread was formed with an outer sheath of hardened material while the inner core remained fluid until heated to dryness. Reasonably strong, flexible fibers could be prepared by this technique. If desired, the polyacrylic acid binder could be removed completely by heating the fiber to temperatures above 500°C.

These continuous fibers can be used for filament winding application or in the manufacture of woven materials.

EXAMPLE VIII

A Chrysotile asbestos dispersion prepared as in the previous Example VII was filtered by suction. After the filtrate was dried, a very stiff, strong paper-like mat was obtained. A similar product was formed by centrifugal filtration. The polyacrylic acid provides strong binding forces which increase the toughness and rigidity of the sheet material. By adjusting the quantity of asbestos, the thickness of the resulting mat can be controlled, thicker sections being suitable for use in building panels and lightweight insulating panels for acoustic purposes, thermal insulation and fire protection.

Incorporation of the Chrysotile ultimate fibrils into the thermoplastic matrics by conventional techniques, i.e. latex compounding, does not always ensure uniformity of the resulting composition. The present invention includes a method for coating the individual asbestos fibrils (encapsulation) with a layer of polymer formed by free-radical polymerization in the presence of the aqueous colloidal Chrysotile dispersions described above. This technique is particularly advantageous in the case of asbestos. Encapsulation of opened asbestos fibers with polymer provides several advantages, namely, ease of molding, lower mixing costs, formation of translucent composites and several other advantages as will be discussed further.

Coating of some inorganic particles with polymers have previously been described in the literature. Particles of macroscopic dimensions are reported to be coated via free-radical or Ziegler-Natta polymerization. However, the method used in the present invention is believed to be unique in that an inorganic polyelectrolyte-treated substrate of colloidal dimensions (average diameter 500 A) can be coated by carrying out the polymerization in aqueous media, eliminating thus the use of expensive and usually nonrecoverable organic solvents. The encapsulated fibril products are also believed to be novel.

According to the present invention, a method is also provided which consists of opening and dispersing Chrysotile asbestos in water as described above, followed by copolymerization of unsaturated monomers with a basic amine monomer functioning both as a co-monomer and pH controller for the above dispersion.

The use of anionic polyelectrolytes (polyacrylic acid, polymethacrylic acid, maleic anhydride polymers and water-soluble copolymers thereof) as asbestos opening and dispersing agents has been described above. The pH of these dispersions is carefully adjusted to about 8–10 by using inorganic or organic bases, in order to obtain coated fibril dispersions which are stable.

According to this preferred aspect of our invention the organic bases used to neutralize the polyelectrolyte may include cationic organic compounds having polymerizable sites such as dimethylaminoethyl methacrylates, t-butylaminoethyl methacrylate or vinylpyridine. Organic or inorganic bases which may be present also, include ammonia, amines, sodium hydroxide, potassium hydroxide or lithium hydroxide as described above. Vinylic non-basic comonomers, are preferably present along with the basic comonomer.

In a typical example, a 0.5 % solution of polyacrylic acid neutralized with dimethylaminoethyl methacrylate was added to a weighed quantity of asbestos shreds and the mixture agitated in a high-speed Waring Blender for 10 minutes. To the resulting stable opened dispersion was added a non-basic monomer such as styrene which contained an oil-soluble initiator such as azobisisobutyronitrile (AIBN). The weight ratio of basic amine comonomer to non-basic monomer (styrene) should be at least about one-third for complete encapsulation. After the polymerization, completely-coated individual Chrysotile fibers were precipitated out and easily recovered. This material after filtering and drying can be easily molded to give translucent specimens of excellent properties.

Encapsulation with other polymers is feasible by this method and is independent of the aqueous solubility of the added non-basic monomers, provided that the weight ratio of amine to non-basic monomer is not less than one-third. Use of oil-soluble initiators such as benzoyl peroxide, lauryl peroxide, methylethylketone peroxide, diisoproplyperoxydicarbonate, and AIBN is preferable in order to minimize the formation of excessive free polymer, i.e. polymer not attached to the surface of the fibrils.

The non-basic vinylic comonomer incorporated to polymerize with the basic monomer (and thus onto the polyelectrolyte), may be any other vinyl monomer polymerizable in aqueous systems. Such monomers include styrene, divinylbenzene, vinyl chloride or fluoride, vinyl acetate, methyl methacrylate, ethyl acrylate, acrylonitrile, and methacrylonitrile.

The concentrations of the individual components for a 1% by weight solids asbestos dispersion ensuring complete encapsulation should be the following: polyelectrolyte at least about 0.15 g. per g. asbestos, an equivalent amount of amine monomer, and weight ratio of amine to non-basic monomer at least about 0.33. The amount of polymer in the final asbestos composite may ary from about 2% to 100% by weight of the asbestos. The polymerization may be carried out in sealed containers under nitrogen with appropriate agitation and temperature control for instance at 60°C and for time periods varying from about 1–16 hours (until the polymerization is completed as desired).

Use of such encapsulated Chrysotile asbestos fibrils is advantageous for several reasons.

a. Greater ease of molding. Time periods required for molding are greatly reduced because the resin surrounds completely, and can wet-out thoroughly the filler.

b. Preparation of translucent composites. The material can be more easily pigmented and better gloss and color potential results from the translucent nature of the encapsulated filler.

c. Lower mixing costs and elimination of the use of expensive organic solvents. Cheaper grades of asbestos can be employed in many cases.

d. Reduced die and tool wear during injection molding or extrusion due to inherent lubrication.

e. High heat distortion temperatures due to the large surface area of the opened asbestos fibrils.

f. Greater ease of handling, less dusting and consequently less danger of cancer and lung disorders ("asbestosis").

Another application is the manufacture of asbestos foams. The polymerization-encapsulation may be carried out in the presence of an oil-soluble blowing agent which decomposes during molding, forming a lightweight encapsulated asbestos foam. Examples of suitable blowing agents are azobisformamide, azobisisobutyronitrile, N,N'-dinitrosopentamethylene tetramine, and toluene-4-sulfonyl hydrazide.

This further aspect of the invention will be better understood by reference to the following representative examples:

EXAMPLE IX 3 g. Chrysotile asbestos, grade Plastibest No. 20 were added to 300 cc of a 0.3 % aqueous polyacrylic acid solution (Acrysol A-3, tradename of Rohm and Haas Company) and the mixture was agitated for three minutes at low speed in a Waring Blendor. 1.96 g. dimethylaminoethyl methacrylate were then added dropwise to pH 8 and stirring was continued at high speed for a total period of 10 minutes. A stable dispersion of colloidal Chrysotile (average diameter 500 A) was produced. 5.88 g. styrene containing 0.5% azobisisobutyronitrile (AIBN) were then added. After 16 hours at 60°C, completely coated asbestos fibers precipitated. The material was then filtered, dried and molded to give excellent translucent specimens. The asbestos content of the encapsulated material, determined by ashing, was found to be 27.8% by weight, in good agreement with the feed composition.

EXAMPLE X

The same procedure was repeated as in Example IX, but in this case the amount of polyacrylic acid was 0.15 g. per g. of asbestos. Equivalent amounts of dimethylaminoethyl methacrylate and amine/styrene weight ratio 1/3 were used. The final encapsulated material containing 46.6% asbestos was easily molded to give a uniform, translucent specimen.

EXAMPLE XI

The same procedure was repeated as in Example IX and X, but in this case methyl methacrylate was used instead of styrene. A very desirable product was obtained.

EXAMPLE XII 1 g. Chrysotile asbestos was dispersed in 100 cc water with 0.15 g. polyacrylic acid and 0.3 g. dimethylaminoethyl methacrylate. 0.9 g. ethyl acrylate containing 0.5% AIBN were then added and polymerization proceeded at 60°C for 16 hours. After the completion of the reaction, 2 g. styrene containing additional catalyst were added and the polymerization continued at the same temperature for 12 hours. Coated Chrysotile with two successive layers of polymer were precipitated in the form of easily filtered spheres. Specimens prepared from this material showed improved Izod impact strengths, due to the pressence of the energy-absorbing polymeric layer on the surface of the fibrils.

EXAMPLE XIII

Figure 2:
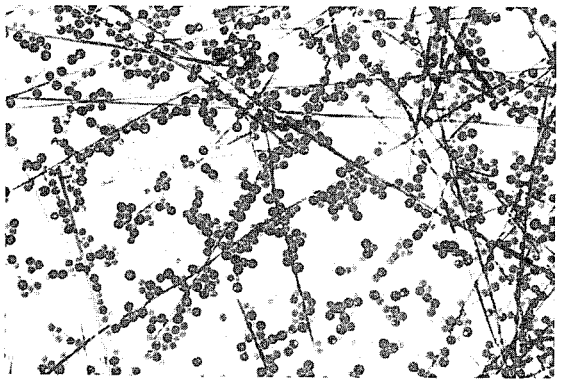
FIG. 2 is a photomicrograph at magnification 10450 of the fibrils opened with a copolymer of styrene-acrylic acid neutralized with ammonia and showing fine uniform-sized globules of styrene polymerized in situ.

Typical polymer-fibril products were examined under the electron microscope. In each case the asbestos fibrils were chemically opened with the vinyl polymer polyelectrolyte having carboxylic acid groups, giving very good opening and dispersion of the individual fibrils. In FIGS. 1 and 2, the fine individual fibrils are clearly shown.

FIG. 1 shows the polymerization behaviour of styrene when sodium hydroxide was used to neutralize polymethacrylic acid the latter acting as the asbestos opening and dispersing agent. There was hardly any polymer attached onto the fibrils in this case, and the major part of the polymer precipitated during polymerization. In FIG. 2, the effect of a more efficient dispersing agent (a copolymer of styrene-acrylic acid neutralized with ammonia) is shown. Many small polystyrene particles partly attached to some of the fibrils are formed when styrene is polymerized in situ. (AIBN initiator was used for the styrene polymerization in both these cases). Upon filtration of this suspension the bulk of the polymer is recovered in the filtrate.

Figure 3:
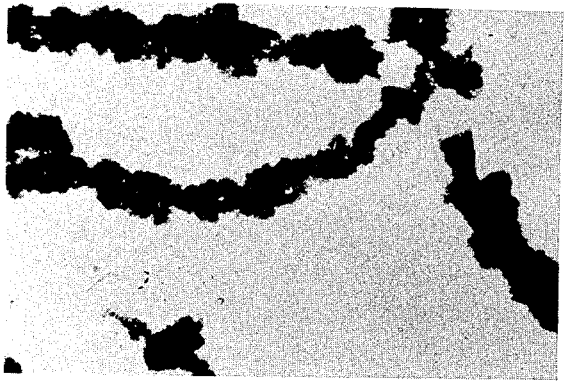
FIG. 3 is a photomicrograph at magnification 6340 of the fibrils opened with polyacrylic acid and neutralized and copolymerized with styrene/dimethylaminoethyl methacrylate (3/1) in situ.
Figure 4:
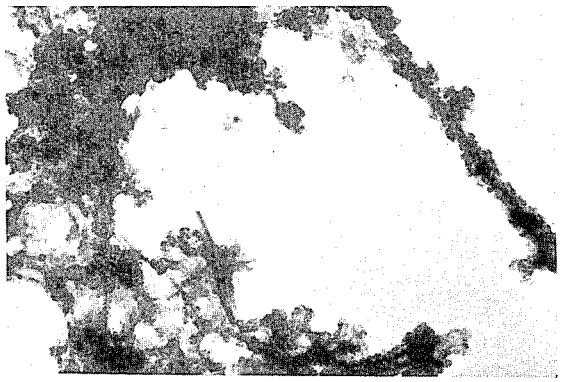
FIG. 4 is a photomicrograph at magnification 7940 of the fibrils opened with polyacrylic acid and neutralized and copolymerized with methyl methacrylate/dimethylaminoethyl methacrylate (3/1) in situ.

FIG. 3 shows individual fibrils opened and dispersed with polyacrylic acid and completely coated with copolymer formed in situ from styrene/dimethylaminoethyl methacrylate (3/1) using AIBN initiator. In FIG. 4 the fibrils were opened and dispersed with polyacrylic acid, and coated with copolymer formed from methyl methacrylate/dimethylaminoethyl methacrylate (3/1) and AIBN initiator. In both these Figures, the polymer is seen to completely encapsulate and adhere to the individual fibrils.

Encapsulated asbestos fibrils may be partially fused into sheets, tubes, or other shapes to be used as porous filter webs of extreme fineness such that only the finest particles may pass through the reticulated structure. The type of polymeric encapsulation may be selected to resist acids or bases, or other corrosive environments which would normally destroy the asbestos. Solvent-resistant sheaths may be provided using acrylonitrile copolymers as the encapsulating material. It is apparent that only a continuous coating would provide a coherent network, and that encapsulation must be essentially complete. The individual coated fibrils may be fused or joined together at their crossover points by the mild application of heat and pressure.

We claim:

1. A method of chemically opening chrysotile asbestos into individual fibrils and at least partially encapsulating with polymer comprising:
   a. physically breaking up the asbestos and shredding the fibres to a preliminary stage,
   b. dispersing the resulting asbestos shreds in an aqueous alkaline medium of alkaline pH up to about 10 containing a soluble vinylic polymer polyelectrolyte having free carboxylic acid groups, with agitation to chemically open and coat the individual asbestos fibrils, and
   c. insolubilizing the polyelectrolyte on the fibrils, and separating coated fibrils from the aqueous medium.

2. The method of claim 1 wherein the polyelectrolyte is selected from the group consisting of polymers of acrylic acid, polymers of methacrylic acid, and copolymers of maleic anhydride.

3. The method of claim 1 wherein the pH of the aqueous medium is adjusted to about 8–10.

4. The method of claim 1 wherein the polyelectrolyte is insolubilized in (c) with an inorganic or volatile organic base.

5. The method of claim 1 wherein the polyelectrolyte on the fibrils is reacted and polymerized with a basic vinylic monomer.

6. The method of claim 1 wherein the polyelectrolyte is insolubilized and reacted and polymerized with both a basic vinylic comonomer and non-basic vinylic comonomer to encapsulate the individual fibrils with polymer, the weight ratio of basic to non-basic comonomer being at least about 0.33

7. A method of chemically opening chrysotile asbestos into individual fibrils and encapsulating the fibrils with polymer as in claim 1 comprising:
   a. physically breaking up the asbestos and shredding the fibres to a preliminary stage,
   b. dispersing the resulting asbestos shreds in an aqueous medium of pH about 8–10 containing both soluble vinylic polymer polyelectrolyte selected from the group consisting of polymers of acrylic acid, polymers of methacrylic acid, and copolymers of maleic anhydride and a basic vinylic monomer selected from the group consisting of dimethylaminoethyl methacrylate, t-butylaminoethyl methacrylate and a vinylpyridine, with agitation to chemically open and coat the individual asbestos fibrils, and
   c. insolubilizing the polyelectrolyte, polymerizing the monomer and separating the encapsulated fibrils from aqueous media.

8. A method of chemically-opening chrysotile asbestos into individual fibrils and encapsulating the fibrils with polymer comprising:
   a. physically breaking up the asbestos and shredding the fibres to a preliminary stage,
   b. dispersing the resulting asbestos shreds in an aqueous medium of alkaline pH up to about 10 containing i. a soluble vinylic polymer polyelectrolyte selected from the group consisting of polymers of acrylic acid, polymers of methacrylic acid, and copolymers of maleic anhydride;

ii. basic vinylic monomer selected from the group consisting of dimethylaminoethyl methacrylate, t-butylaminoethyl methacrylate and a vinylpyridine; and iii. non-basic vinylic comonomer and a polymerization initiator therefor; to chemically open and coat the individual asbestos fibrils, the weight ratio of basic monomer to non-basic comonomer being at least about 0.33, and c. insolubilizing the polyelectrolyte, copolymerizing the basic and non-basic monomers to encapsulate the fibrils with polyelectrolyte and copolymer, and separating the encapsulated fibrils from aqueous media.

9. The method of claim 8 wherein the non-basic monomer is a styrene and an oil-soluble initiator is used.

10. Chemically-opened, chrysotile asbestos fibrils encapsulated with polymer comprising a vinylic polymer polyelectrolyte and polymerized basic vinylic monomer, the polyelectrolyte having carboxylic acid groups neutralized by the basic groups of said monomer, the amount of polymer being from about 2 to 100% by weight of the asbestos.

11. The encapsulated fibrils of claim 10 wherein the basic vinylic monomer is selected from the group consisting of dimethylaminoethyl methacrylate, t-butylaminoethyl methacrylate and a vinylpyridine.

12. The encapsulated fibrils of claim 10 wherein the polymer comprises non-basic vinylic monomer copolymerized with said basic monomer.

13. The encapsulated fibrils of claim 10 wherein the polyelectrolyte is selected from the group consisting of polymers of acrylic acid, polymers of methacrylic acid, and copolymers of maleic anhydride.

* * * * *